US012737751B2

(12) United States Patent
Ezrielev et al.

(10) Patent No.: US 12,737,751 B2
(45) Date of Patent: Sep. 15, 2026

(54) LAST RESORT ACCESS TO DIGITAL WALLET OR BLOCKCHAIN ASSETS WITH SMART CONTRACTS

(71) Applicant: Dell Products L.P., Round Rock, TX (US)

(72) Inventors: Ofir Ezrielev, Be'er Sheba (IL); Yehiel Zohar, Sderot (IL); Lee Serfaty, Be'er Sheba (IL)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 18/308,161

(22) Filed: Apr. 27, 2023

(65) Prior Publication Data

US 2024/0362621 A1 Oct. 31, 2024

(51) Int. Cl.
*G06Q 20/36* (2012.01)
*G06Q 20/02* (2012.01)

(52) U.S. Cl.
CPC ............. *G06Q 20/36* (2013.01); *G06Q 20/02* (2013.01); *G06Q 2220/00* (2013.01)

(58) Field of Classification Search
None
See application file for complete search history.

(56) References Cited

U.S. PATENT DOCUMENTS

2013/0191632 A1* 7/2013 Spector .................. H04L 9/085 713/155
2020/0005293 A1* 1/2020 Opeola ................ G06Q 20/065
2020/0013025 A1* 1/2020 Verma .................. H04L 9/3297
2020/0234257 A1* 7/2020 Mallik ................ G06Q 20/367
2020/0349147 A1* 11/2020 Vukich ................ G06Q 20/065
2020/0380476 A1 12/2020 Trudeau et al.
2021/0073401 A1* 3/2021 Wushour .................. H04L 9/30
2023/0267452 A1* 8/2023 Isogawa ............... G06Q 20/405 705/75
2023/0385815 A1 11/2023 Jakobsson et al.
2023/0403144 A1* 12/2023 Rhodin ................. H04L 9/3239
2024/0029036 A1* 1/2024 Bennett ................ G06Q 20/223
2024/0127233 A1 4/2024 Doney
2024/0135364 A1* 4/2024 Agudelo ............. G06Q 20/389
2024/0185191 A1 6/2024 Bernardi
2024/0232849 A1 7/2024 Blazevige

FOREIGN PATENT DOCUMENTS

WO 2021/245476 A1 12/2021

OTHER PUBLICATIONS

Itai Turbahn, "Recovery Methods in Wallets", Jun. 3, 2022 (Year: 2022).*

* cited by examiner

*Primary Examiner* — Patrick Mcatee
*Assistant Examiner* — Timothy Paul Sax
(74) *Attorney, Agent, or Firm* — Workman Nydegger

(57) ABSTRACT

Access to digital assets when a private key is lost or unavailable is disclosed. A digital wallet may store a digital asset and a smart contract. When conditions of the smart contract are satisfied, the digital asset is automatically transferred to a new digital wallet that is associated with a new digital key. A user may acquire the new digital key and access the digital assets now stored in the new digital wallet.

12 Claims, 6 Drawing Sheets

LAST RESORT ACCESS TO DIGITAL WALLET OR BLOCKCHAIN ASSETS WITH SMART CONTRACTS

RELATED APPLICATIONS

U.S. application Ser. No. 18/307,993, filed Apr. 27, 2023, and titled ZERO-TRUST DIGITAL WALLET (BLOCKCHAIN) WITH SMART CONTRACTS, which is incorporated by reference in its entirety, relates to protecting the digital asset in the event the private key is stolen or compromised.

FIELD OF THE INVENTION

Embodiments of the present invention generally relate to blockchain networks. More particularly, at least some embodiments of the invention relate to systems, hardware, software, computer-readable media, and methods for accessing a digital wallet.

BACKGROUND

Generally stated, blockchain technology is a technology that allows data to be stored in blocks that are linked together. Blockchain technology can be used for various purposes including, by way of example, energy, finance, media, entertainment, and retail purposes. A well-known use of a blockchain network is to store digital assets such as cryptocurrency. Blockchain networks allow the digital assets and transactions related to the digital assets to be recorded and tracked.

A blockchain network may have certain advantageous features. For example, blockchain networks are often decentralized. In decentralized blockchain networks, a single individual or a single entity does not have total control of the blockchain network or unilateral decision-making capabilities. Further, a blockchain network is often transparent such that users or members can have confidence in the data stored in the blockchain network and in changes made to data stored in the blockchain network. Members of a blockchain network can trust the blockchain network because the data is available to all members of the blockchain network and all transactions relative to the data are stored in the blockchain network and visible to the members.

Blockchain networks are also immutable. Consequently, no user can tamper with a transaction once the transaction has been recorded in the blockchain network. In order to change a transaction, it is necessary to add the change to the blockchain network such that the data and all changes or transactions related to the data are visible.

Even though blockchains provide immutability and transparency, the ability to use and access the data or to perform transactions often depends on the use of a private cryptographic key. The control over and/or access of a user to their data (or assets) in the blockchain network may be compromised if the user's private key is unavailable.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
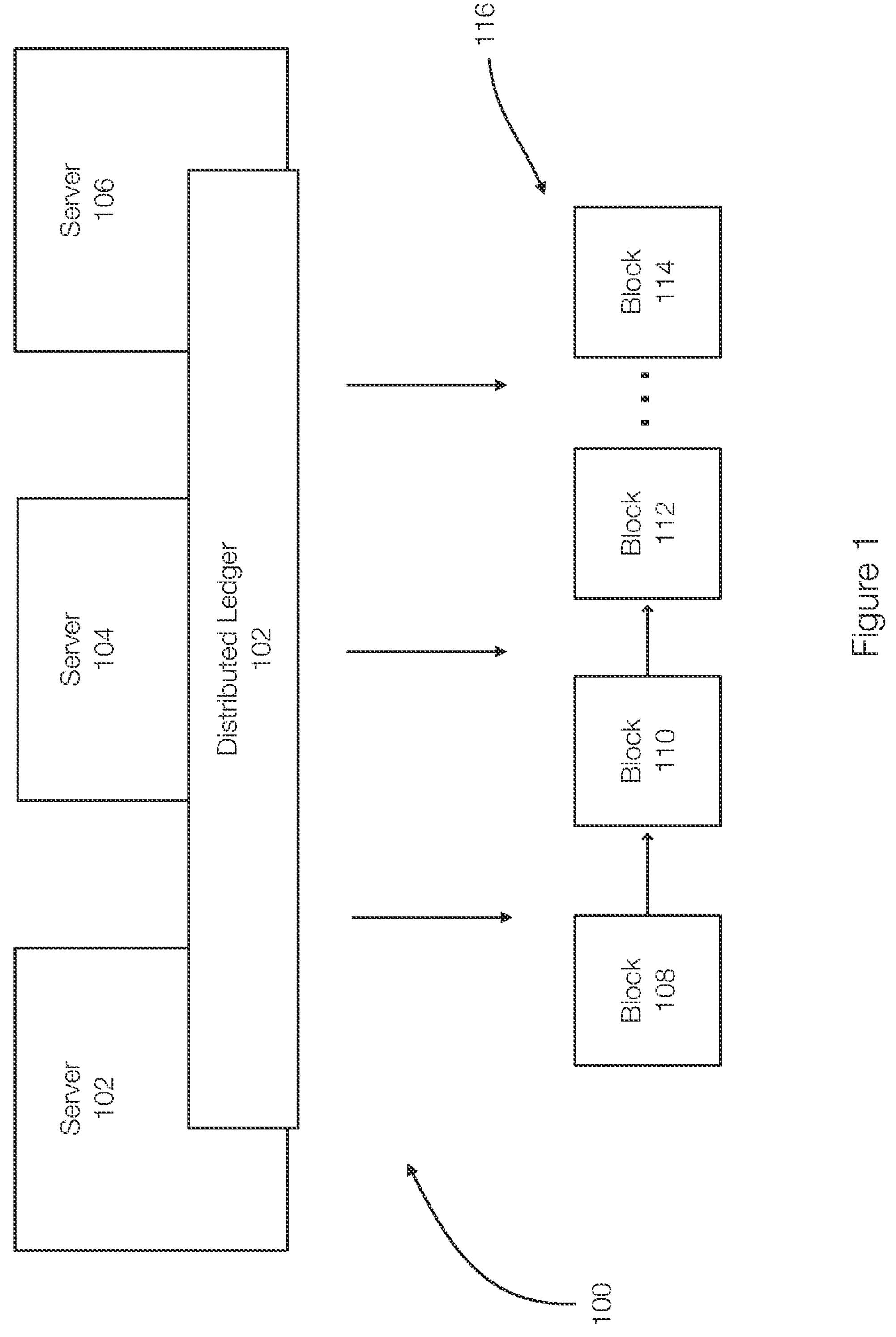
FIG. 1 discloses aspects of a blockchain network.

Embodiments of the present invention generally relate to blockchain networks and smart contracts. More particularly, at least some embodiments of the invention relate to systems, hardware, software, computer-readable media, and methods for accessing a digital wallet in a blockchain network. More specifically, embodiments of the invention relate to accessing a digital asset when a private key to the digital wallet storing the digital asset has been lost or is unavailable.

In general, example embodiments of the invention relate to blockchain network operations, digital wallet operations, smart contract operations, zero-trust operations, asset protection operations, asset transfer operations, and the like or combinations thereof.

Blockchain networks (or blockchains) can be used to store and track information of any kind such as medical records, financial records, confidential information, digital assets, school records, business transactions, online payments, cryptocurrencies, or the like. Embodiments of the invention are discussed in the context of digital assets but may be adapted to other data or content stored in blockchain networks. Examples of digital assets include, but are not limited to, anything that is stored digitally and has value to an organization. Thus, data such as documents, audio, videos, logos, websites, code, and other data are examples of digital assets. Digital assets also include nonfungible tokens, cryptocurrency, security tokens, digital currencies, or the like.

A blockchain, which may also be referred to as a distributed ledger or a distributed database, often store information in blocks that are usually related to each other both cryptographically and chronologically. When new data or information is added to a blockchain or when a transaction is performed relative to a digital asset, a new block may be created, filled with the relevant data or information, and chained to the blockchain. If there is a need to change data in an existing block, the change is usually reflected in a new block because existing blocks are immutable.

In fact, the immutability of blockchains is one of its advantages. Blockchains are usually implemented in a decentralized manner, which helps ensure that no individual user or group has control of the blockchain. For example, data or information, once entered into the blockchain, cannot be removed from the blockchain. Consequently, transactions are permanently recorded and viewable to anyone with access to the blockchain.

Blockchains also have disadvantages. While the irrevocability and immutability of a transaction is often viewed as a benefit, the irrevocability of a transaction and the immutability can also be viewed as a disadvantage. For example, there is often no ability to access a digital asset if the user's private key is lost or forgotten. If a user loses or forgets their private key, the user cannot access their digital asset and the digital asset is, in one example, effectively lost.

Embodiments of the invention thus relate to restoring access to digital assets that, conventionally, cannot be accessed. For example, a digital wallet storing a digital asset cannot be accessed when a private key needed to access a digital wallet is lost or forgotten.

The ability to access a digital wallet and digital assets stored therein is achieved by holding the digital asset using a smart contract. The smart contract may specify that if a digital asset of the wallet is not accessed for a specified period of time, the digital asset transferred to a different digital wallet, referred to herein as a last resort digital wallet. As long as the user has the private key needed to access the last resort digital wallet, access to the digital asset is restored. The last resort digital wallet may be another digital wallet that may be associated with the same user or another user trusted by the original user.

In one example, the private key needed to access the last-resort digital wallet may be saved on a public cloud or other location such that the last resort private key is safeguarded and protected from loss. If the last resort private key is compromised or attacked but not yet activated, the user may be able to change the last resort private key. Further, if the private key to the original digital wallet is lost, the user can remove the last resort private key from the cloud and store the last resort private key more securely to increase security.

In another example, the last resort private key may be further protected by partitioning the last resort private key into parts or shares. For example, the last resort private key may be divided into shares using Shamir's Secret Sharing. The shares are distributed using different media or mechanisms. Shares of the last resort private key may also be transmitted to other trusted users and reassembled when needed.

Embodiments of the invention improve the security of a blockchain by enabling or restoring access to a digital asset or other data. In one example, a digital asset stored in a blockchain is associated with a script or a smart contract. The smart contract may be configured to execute an action (a transaction in the blockchain) when certain conditions are satisfied.

A smart contract may be configured to perform a recovery operation relative to a digital asset when the private key is lost or unavailable. For example, the smart contract may be configured to perform a transaction relative to the digital access when certain conditions are satisfied. In one example, the smart contract is configured to transfer the digital assets when the digital assets have not been accessed for a specified period. When the specified time period is satisfied, the user may be notified of the transfer to the last resort wallet. This allows the user to access the digital assets that have been transferred to the last resort wallet. If the lasts resort private key has been divided into shares, the last resort private key will need to be reassembled prior to accessing the last resort wallet.

The smart contract may be triggered by other mechanisms in addition to a time period. For example, the smart contract may be configured to transfer the asset if a series of deposits or additions are made to the digital asset in the digital wallet. The smart contract may require the deposits to be specific amounts. The conditions required to trigger the smart contract may be known only to the user or those with whom the user chooses to share the conditions.

In one example, it is possible for an attacker to gain access to the private key. Thus, triggering the smart contract may be further protected by implementing the smart contract using hashes or encrypted information to prevent the attacker from discerning or discovering this information as public. For example, the smart contract may have hashes of the series of deposits or additions. This would prevent an attacker that has acquired the key from discovering the specific deposits or series of deposits or series of transactions.

Even if an attacker knows the conditions that will trigger the smart contract, the attacker is unable to access the digital asset because the smart contract will send the digital asset to a specific digital wallet. The immutability of the blockchain prevents the attacker from altering the smart contract, which is in the blockchain. However, it allows the user to access the digital wallet in the event that the private key is lost or otherwise unavailable. The smart contract may be configured to provide protections related to both compromised private keys and/or lost private keys.

FIG. 1 discloses aspects of a blockchain. The blockchain 100 is discussed in the context of digital assets. In this example, the blockchain 100 is implemented as a digital ledger 102 in which transactions relative to digital assets are recorded. The ledger 102 is distributed across multiple computing devices, represented by servers 102, 104, and 106. In one example, the distributed ledger 102 is implemented in a peer-to-peer network.

The ledger 102 includes a chain of blocks 116. The blocks 116 in the blockchain 100 or the ledger 102 are represented by blocks 108, 110, 112, and 114. These blocks are linked cryptographically and chronologically. Each time a new block is added, the block is added to the end of the blockchain in one example. As transactions are performed, blocks are added to the blockchain 100.

Figure 2:
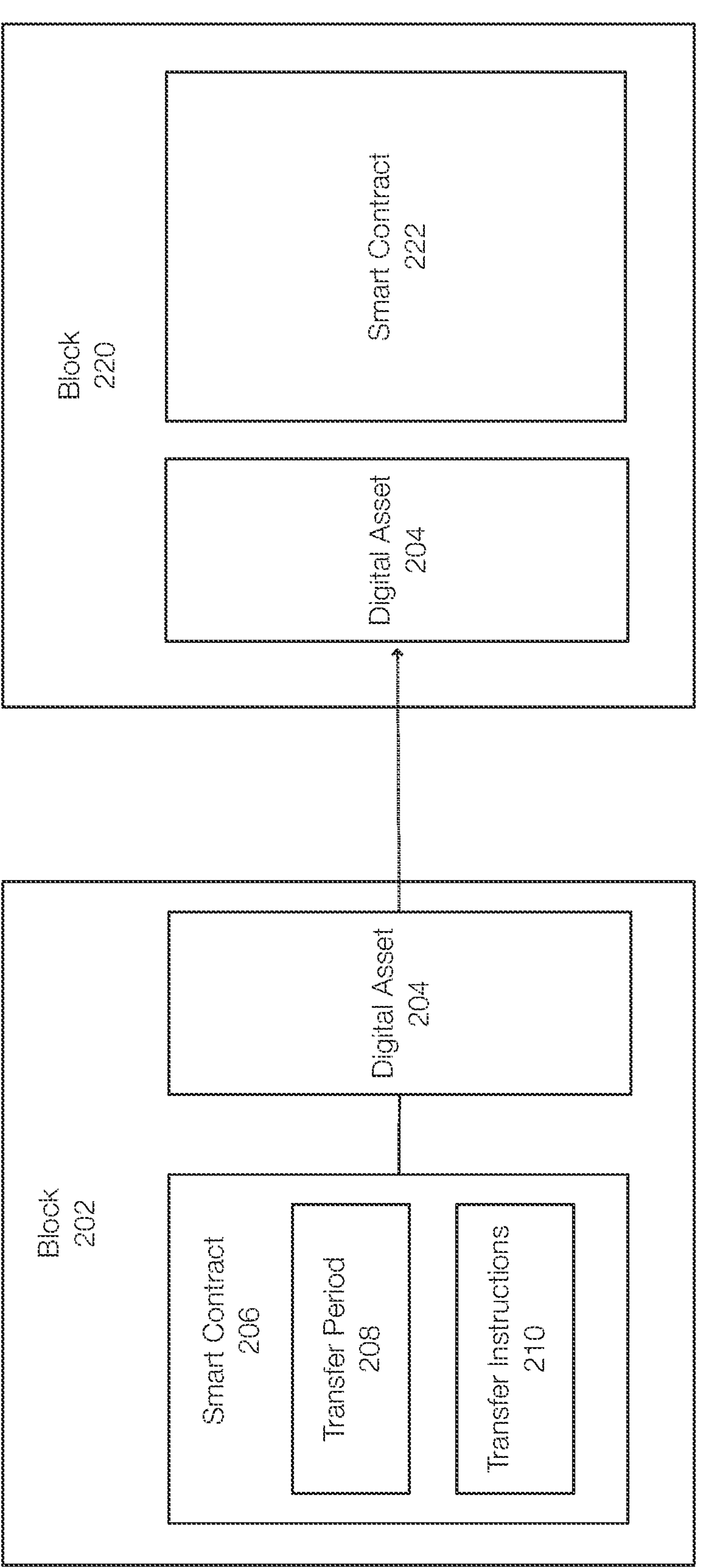
FIG. 2 discloses aspects of a blockchain network with last resort access.

FIG. 2 discloses aspects of implementing access to digital assets. FIG. 2 illustrates a block 202 that includes data. The data includes a digital asset 204 and a smart contract 206. The smart contract 206 further includes or implements a mechanism to recover the digital asset 204 in the event that an owner is unable to access the digital asset 204. In this example, the allow list 208 specifies conditions that result in transferring the digital asset 204. In one example, the smart contract 206 is associated with a transfer period 208. If the transfer period 208 is satisfied, the transfer instructions 210 are implemented and the digital asset 204 is transferred to the block 220 (or another digital wallet). The transfer period 208 may be a time during which the digital asset 204 is not accessed. Any access (viewing, depositing, etc.) may restart the transfer period 308.

More specifically in this example, the transfer instructions 210 transfer the digital asset 204 to the block 220, which may be associated with a new smart contract 222. More specifically in one example, the digital asset 204 is transferred to a different digital wallet (e.g., a last resort digital wallet), which may be partially represented by the block 220. The smart contract 222 may also implement a transfer period for the transferred digital asset 204 to protect against loss of the associated private key.

Figure 3:
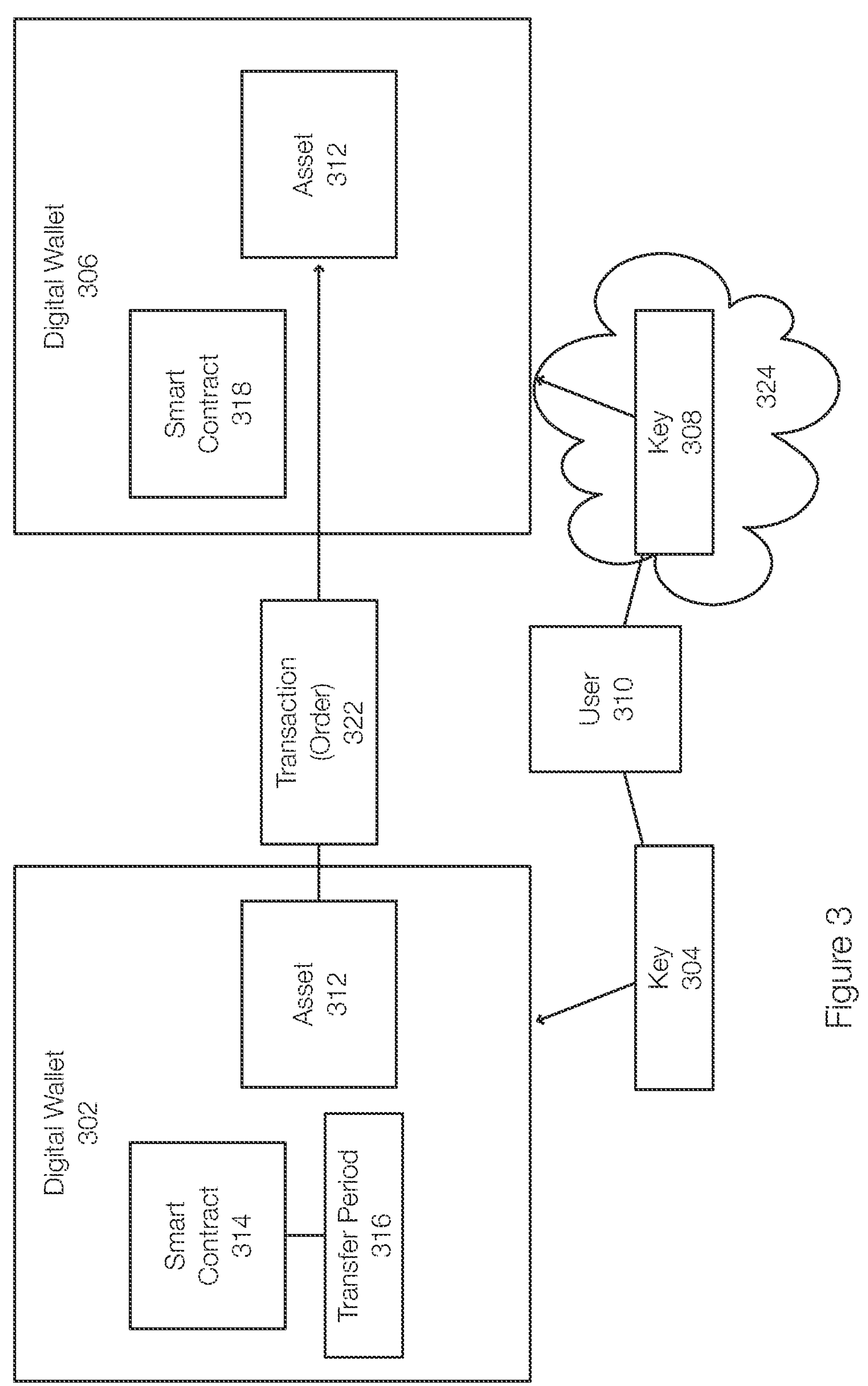
FIG. 3 discloses aspects of digital wallets that provide a user with last resort access to data such as digital assets.

FIG. 3 illustrates an example of transferring a digital asset from a current digital wallet to a different digital wallet. FIG. 3 illustrates a digital wallet 302 and a digital wallet 306 that are implemented, in one example, using blockchain technologies. The digital wallet 306 is an example of a last resort digital wallet. The digital wallet 302 may include addresses and digital keys. The digital wallet 302 is configured to enable access to the digital assets stored in the blockchain. More specifically, a private digital key enables access to and control of the asset 312.

In this example, the digital wallet 302 and the digital wallet 306 are both associated with a user 310. The digital wallet 302 is associated with a key 304 and the digital wallet 306 is associated with a key 308. The keys 304 and 308 are associated with different wallets and are separate. The keys 304 and 308 may be private keys that are associated with corresponding public keys.

More specifically, a digital wallet 302 may be associated with both a private key and a public key. The private key may be, for example, an alphanumeric code that may be used for cryptographical purposes. The digital wallet 302 may be a set of public addresses and private keys. Anyone can deposit a digital asset to a public address using the public key. However, digital assets generally cannot be removed or transferred from an address without the appropriate private key.

It is important to safeguard the key 304 (the private key). When a transaction from the digital wallet 302 is initiated, a digital signature is created by processing the transaction with the key 304. Once the transaction is authorized and broadcast or recorded in the blockchain, the transaction cannot be changed. Consequently, the asset 312 cannot be accessed if the key 304 is lost.

In this example, the asset 312 is associated with a smart contract 314 that specifies a time or transfer period 316. The smart contract 314 is configured to execute a transaction 322 when the transfer period 316 is achieved and the asset 312 has not been accessed by the user 310. The smart contract 314 may allow additional assets to be added to the digital wallet 302. More specifically, the smart contract 314 is configured to transfer the asset 312 when the asset 312 has not been accessed by the user 310 using the key 304 for a specified period of time. The smart contract 314 may be triggered when the transfer period 316 expires and the transaction 322 is performed to move the asset 312 to the digital wallet 306. The digital wallet 306 may implement a similar smart contract 318.

In this example, the key 308 may be stored in a public cloud 324 or other location. In one example, the user 310 may select a location where the user is unlikely to lose the key 308. If the user 310 loses the key 304, the user 310 may retrieve the key 308 from the cloud 324 to save the key 308 more securely. Because the digital wallet 306 is initially empty, there is no danger of losing the asset even if the key 308 is compromised. If the key 308 is compromised prior to triggering the smart contract 314, the user 310 may replace the key 308 with a new key. When the smart contract 314 is triggered, the user 310 may remove the key from the cloud 324 to a different location or a more secure location.

Figure 4:
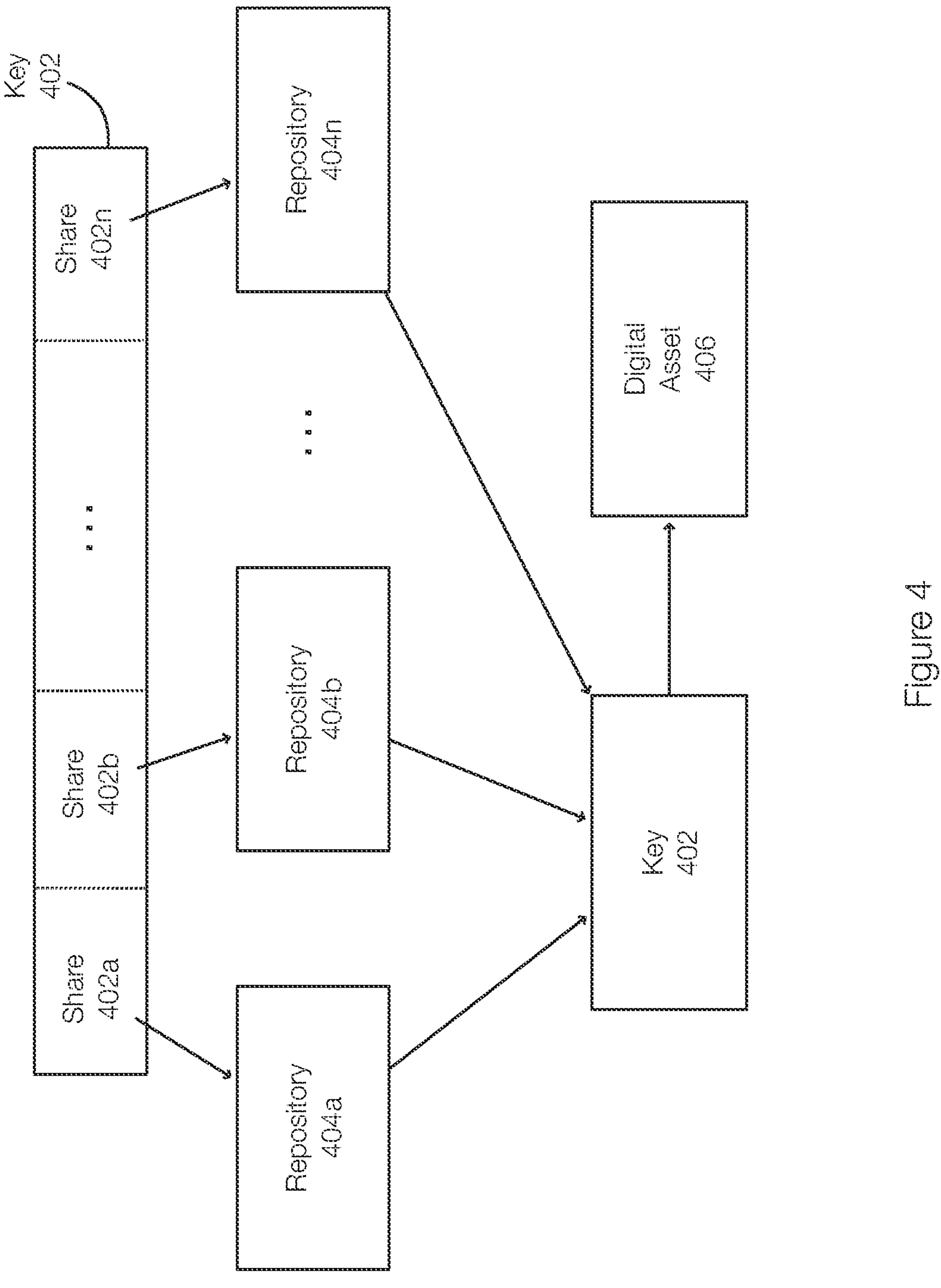
FIG. 4 discloses aspects of dividing a private key to a last resort digital wallet into shares or pieces.

FIG. 4 discloses aspects of protecting a private key for a last resort digital wallet. In this example, the key 402 is associated with a last resort digital wallet. To protect the key 402, the key 402 is divided into shares, represented by shares **402*a*, 402*b*, and 402*n*. The shares 402*a*, 402*b*, and 402*n* may be distributed to various repositories represented by repositories 404*a*, 404*b*, and 404*n*. The repositories may be, for example, an email address, a text message or other messaging application, or the like. By distributing the shares 402*a*, 402*b*, and 402*n* to different repositories, an attacker may have more difficulty acquiring the key 402** to the last resort digital wallet. An attacker would need to compromise multiple systems.

If the key is distributed according to, by way of example, Shamir's Secret Sharing, the key 402 can be reconstructed from a quorum of the shares 402, **402*b*, and 402*n*. Thus, even if some of the shares are compromised, the attacker is unlikely to achieve a quorum of the shares. Further, the user is more likely to still have a quorum of the shares and will be able to reconstruct the key 402** from the quorum if necessary.

When the smart contract is triggered and the digital asset 406 is transferred to the last resort digital wallet, a user may access the repositories **404*a*, 404*b*, and 404*n* and reconstruct the key 402, which allows the user to access the digital asset 406** now stored in the last resort digital wallet.

Figure 5:
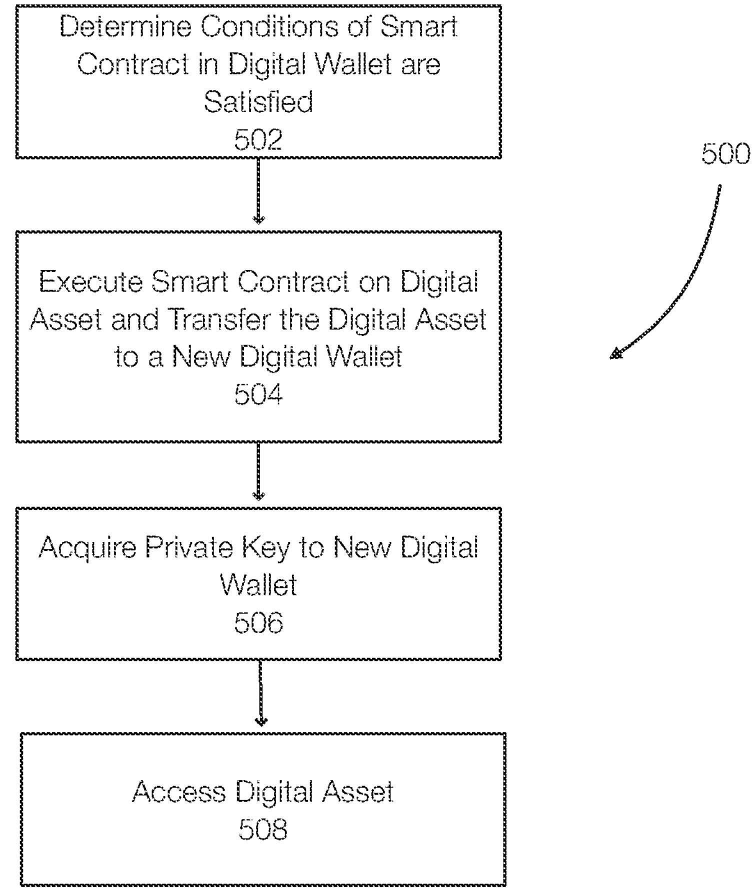
FIG. 5 discloses aspects of a method for accessing data stored in a blockchain network when a private key is lost or unavailable.

FIG. 5 discloses aspects of a method for accessing digital assets in the event of a lost or unavailable private key. The method 500 includes determining 502 that conditions of a smart contract associated with a digital asset have been satisfied. When the conditions are satisfied, the smart contract executes 504 and transfers the digital asset from the current digital wallet (or block) to a new digital wallet (or new block). The private key to the new digital wallet is acquired 506 and the digital asset may be accessed 508.

The conditions of the smart contract may vary and may relate to a time period. If the digital asset is not accessed for a specified period of time, the digital asset is transferred to the new digital wallet. If a user has lost the private key but does not want to wait for the transfer period to expire due to the length of the transfer period, the smart contract may be triggered when other conditions specified in the smart contract are satisfied. The conditions may be selected by the user and may be known only to the user. For example, the smart contract may include hashes of values or content. When the user submits the content, the content can be hashed to determine whether the content is the correct content. This prevents an attacker from discerning the correct content even if the hash value is visible in the blockchain.

Once the digital asset is transferred, the process of acquiring the key may include retrieving the key from an online storage location. Acquiring the key may also include acquiring the pieces or shares of the key from various online locations, email, messages, or the like or combinations thereof. Once the new private key is acquired or reconstructed from the shares or pieces, the digital asset can be accessed.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s).

Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, blockchain operations, smart contract operations, data asset protection operations, or the like. More generally, the scope of the invention embraces any operating environment in which the disclosed concepts may be useful.

New and/or modified data collected and/or generated in connection with some embodiments, may be stored in a data or storage environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data related functionality. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. The term data may also refer to digital assets or other types of objects or information capable of being stored in blockchain networks.

It is noted that any operation(s) of any of the methods disclosed herein including the Figures, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: determining that conditions of a smart contract associated with a digital asset are satisfied, wherein the smart contract and the digital asset are stored in a digital wallet implemented in a blockchain network and associated with a private key, executing the smart contract after determining that the conditions are satisfied by transferring the digital asset from the digital wallet to a second digital wallet, acquiring a second private key of the new digital wallet, and accessing the digital asset stored in the second digital wallet.

Embodiment 2. The method of embodiment 1, wherein the second digital wallet includes a second smart contract associated with the digital wallet.

Embodiment 3. The method of embodiment 1 and/or 2, wherein the conditions comprise a transfer period of a specified time period.

Embodiment 4. The method of embodiment 1, 2, and/or 3, wherein the conditions are satisfied when the digital asset in the digital wallet have not been accessed for the specified time period.

Embodiment 5. The method of embodiment 1, 2, 3, and/or 4, wherein the conditions are specified by an owner of the digital wallet and of the second digital wallet.

Embodiment 6. The method of embodiment 1, 2, 3, 4, and/or 5, further comprising acquiring the second private key from a cloud storage.

Embodiment 7. The method of embodiment 1, 2, 3, 4, 5, and/or 6, further comprising acquiring the second private key by reconstructing shares of the second private key.

Embodiment 8. The method of embodiment 1, 2, 3, 4, 5, 6, and/or 7, wherein the shares are located in one or more of cloud storage, an email, a message, and/or another user.

Embodiment 9. The method of embodiment 1, 2, 3, 4, 5, 6, 7, and/or 8, further comprising dividing the second private key into the shares.

Embodiment 10. The method of embodiment 1, 2, 3, 4, 5, 6, 7, 8, and/or 9, wherein the private key is unavailable or lost.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client, or service may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
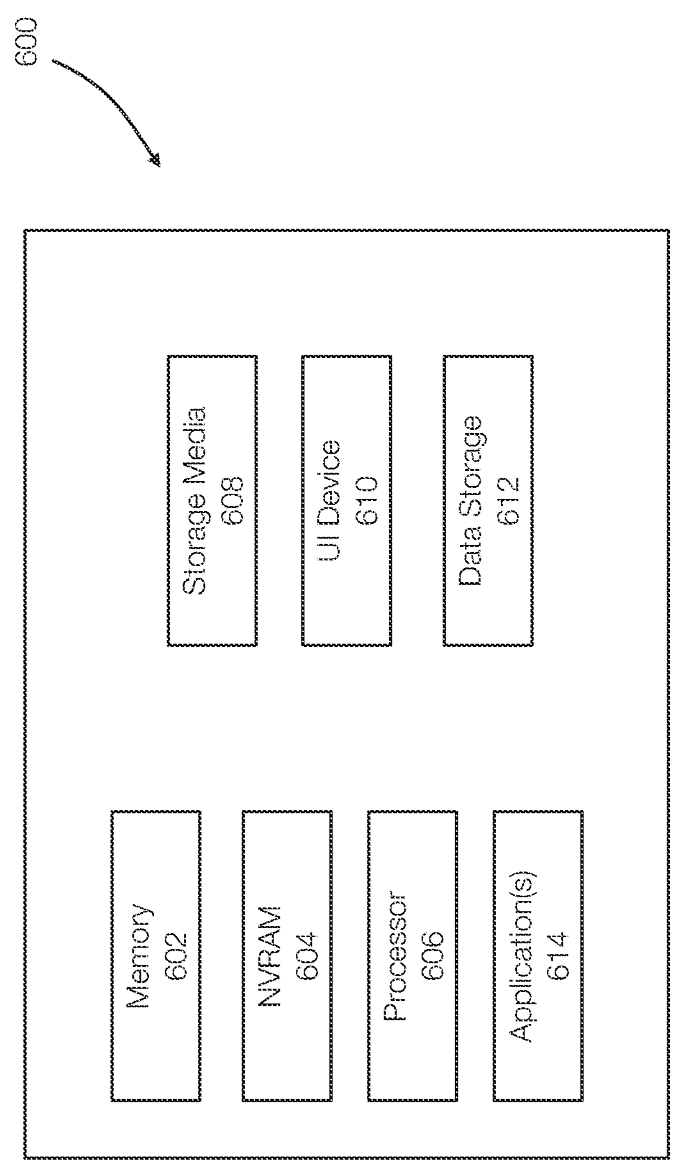
FIG. 6 discloses aspects of a computing device, a computing system, or a computing entity.

With reference briefly now to FIG. 6, any one or more of the entities disclosed, or implied, herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

storing an immutable smart contract in a blockchain network, wherein the smart contract includes an encrypted hash of a value defined by an owner of a first digital wallet and of a second digital wallet, wherein the smart contract specifies transfer conditions;

storing the digital asset in the first digital wallet implemented in the blockchain network, wherein the digital wallet is associated with a private key and the smart contract is configured to protect the digital asset against loss of the private key, wherein the smart contract identifies the second digital wallet and the transfer conditions; and ensuring access to the digital asset when the private key required to access the digital asset is lost or unavailable by:

receiving a recovery value from a user without receiving any user identification associated with the first digital wallet, wherein the recovery value comprises a series of deposits;

generating, by the smart contract, an encrypted hash of the series of deposits;

determining that the transfer conditions of the smart contract associated with the digital asset are satisfied when the encrypted hash of the series of deposits matches the encrypted hash of the value in the smart contract;

executing the smart contract after determining that the transfer conditions are satisfied automatically by transferring the digital asset from the first digital wallet to the second digital wallet;

acquiring a second private key of the second digital wallet from a cloud storage or by reconstructing shares of the second private key; and accessing the digital asset stored in the second digital wallet using the second private key.

2. The method of claim 1, wherein the second digital wallet includes a second smart contract associated with the second digital wallet.

3. The method of claim 1, further comprising acquiring the second private key from a cloud storage.

4. The method of claim 1, further comprising acquiring the second private key by reconstructing shares of the second private key.

5. The method of claim 4, wherein the shares are located in one or more of cloud storage, an email, a message, and/or another user.

6. The method of claim 5, further comprising dividing the second private key into the shares.

7. A non-transitory storage medium having stored therein instructions that are executable by one or more hardware processors to perform operations comprising:

storing an immutable smart contract in a blockchain network, wherein the smart contract includes an encrypted hash of a value defined by an owner of a first digital wallet and of a second digital wallet, wherein the smart contract specifies transfer conditions;

storing the digital asset in the first digital wallet implemented in the blockchain network, wherein the digital wallet is associated with a private key and the smart contract is configured to protect the digital asset against loss of the private key, wherein the smart contract identifies the second digital wallet and the transfer conditions; and ensuring access to the digital asset when the private key required to access the digital asset is lost or unavailable by:

receiving a recovery value from a user without receiving any user identification associated with the first digital wallet, wherein the recovery value comprises a series of deposits;

generating, by the smart contract, an encrypted hash of the series of deposits;

determining that the transfer conditions of the smart contract associated with the digital asset are satisfied when the encrypted hash of the series of deposits matches the encrypted hash of the value in the smart contract;

executing the smart contract after determining that the transfer conditions are satisfied automatically by transferring the digital asset from the first digital wallet to the second digital wallet;

acquiring a second private key of the second digital wallet from a cloud storage or by reconstructing shares of the second private key; and accessing the digital asset stored in the second digital wallet using the second private key.

8. The non-transitory storage medium of claim 7, wherein the second digital wallet includes a second smart contract associated with the second digital wallet.

9. The non-transitory storage medium of claim 7, further comprising acquiring the second private key from a cloud storage.

10. The non-transitory storage medium of claim 7, further comprising acquiring the second private key by reconstructing shares of the second private key.

11. The non-transitory storage medium of claim 10, wherein the shares are located in one or more of cloud storage, an email, a message, and/or another user.

12. The non-transitory storage medium of claim 11, further comprising dividing the second private key into the shares.

* * * * *